(12) United States Patent
Chen

(10) Patent No.: US 11,300,204 B1
(45) Date of Patent: Apr. 12, 2022

(54) WEAR-PREVENTIVE AIR-CHARGER PISTON STRUCTURE

(71) Applicant: DONGGUAN HESHENG MACHINERY & ELECTRIC CO., LTD., Dongguan (CN)

(72) Inventor: Chi-Wen Chen, Dongguan (CN)

(73) Assignee: DONGGUAN HESHENG MACHINERY & ELECTRIC CO., LTD., Dongguan (CN)

( * ) Notice: Subject to any disclaimer, the term of this patent is extended or adjusted under 35 U.S.C. 154(b) by 0 days.

(21) Appl. No.: 17/033,951

(22) Filed: Sep. 28, 2020

(51) Int. Cl.
| *F16J 1/12* | (2006.01) |
| *F16J 1/00* | (2006.01) |
| *F04B 39/00* | (2006.01) |
| *F16J 1/02* | (2006.01) |
| *F04B 53/14* | (2006.01) |

(52) U.S. Cl.
CPC ........... *F16J 1/005* (2013.01); *F04B 39/0005* (2013.01); *F04B 53/14* (2013.01); *F16J 1/02* (2013.01); *F16J 1/12* (2013.01)

(58) Field of Classification Search
CPC .................................... F16J 1/12; F16J 1/005
See application file for complete search history.

(56) References Cited

U.S. PATENT DOCUMENTS 5,064,359 A * 11/1991 Plummer .............. F04B 39/042
                                                                      417/489
6,279,421 B1 * 8/2001 Faulkner ............. F04B 39/0005
                                                                      74/579 R

* cited by examiner

*Primary Examiner* — F Daniel Lopez
(74) *Attorney, Agent, or Firm* — Leong C. Lei

(57) ABSTRACT

A wear-preventive air-charger piston structure is provided. The piston rod has a top forming a piston top seat on which a piston ring is disposed. The piston ring is covered with a top cover that is combined with the piston top seat. The top cover is provided with an airtight plate mounted thereto to form a complete piston structure. A buffering element is arranged between the piston top seat and the piston ring. The buffering element has an outside diameter smaller than the piston ring, so that when the piston ring, which is driven by a crankshaft to do an up-and-down movement, is put in an inclined oscillating condition and at a high position of an oscillation side, the buffering element functions to absorb the stress acting on the piston ring at the high position of the oscillation side to effectively prevent detachment and breaking of the piston ring.

4 Claims, 5 Drawing Sheets

WEAR-PREVENTIVE AIR-CHARGER PISTON STRUCTURE

TECHNICAL FIELD OF THE INVENTION

The present invention relates to a wear-preventive air-charger piston structure, and more particularly to at least one buffering element being arranged between a piston top seat of a piston rod and a piston ring, wherein the buffering element has the characteristics of elastic restoration or springing back and the buffering element has an outside diameter smaller than an outside diameter of the piston ring to prevent contact abrading of the buffering element with an inside surface of a cylinder, so that when the piston ring, as being driven by a crankshaft, is put in an inclined oscillating condition and at a high position of an oscillation side, the buffering element functions to absorb (buffer) the stress applied to the piston ring at the high position of the oscillation side to effectively prevent detachment and breaking of the piston ring resulting from over concentration of stress at a contact point of the piston ring with the inside surface of the cylinder at the high position of the oscillation side.

DESCRIPTION OF THE PRIOR ART

An air charger is operated in such a way that an internal electric machine directly drives a crankshaft, causing the crankshaft to generate a rotary motion, so as to drive, by means of a connection rod, a piston to carry out an up-and-down reciprocal motion, which varies a volume of a cylinder to compress and discharge a compressible gas. In the stroke of compression, due to the variation of the cylinder volume, the compressed air is conducted through a one-way valve (a check valve) to pass through a hose to a nozzle to be discharged therefrom, and consequentially, an inflatable can be charged with air and inflated.

However, it has been long a trouble to the manufactures that a piston ring mechanism of a piston mechanism of an air charger is defective in that, as the most important drawback among others, when the piston ring moves up and down in a cylinder, a stress resulting from pulling and driving may cause detachment and breaking of the piston ring. A solution for such an issue that has been currently proposed is that polytetrafluoroethylene (Teflon) powder or graphene powder is applied to the outside of the piston ring to provide an effect of lubrication in order to prevent detachment and breaking of the piston ring.

However, it has been found that in an operation (or test) of a piston ring with Teflon powder applied thereon, the Teflon powder shows an ineffective position, which is generally at a high position at the oscillation side that a crankshaft drives a pull rod assembly (for example, with the cylinder head removed and the crankshaft and the pull bar assembly left on a spindle of a motor for operation, when dynamic balance is reached, the pull bar assembly forms an angle relative to a vertical line and is undergoing an up-and-down reciprocal motion in an inclined condition; and as analysis from the view angle position of the piston ring, since the crankshaft drives the pull bar assembly in an inclined condition, the oscillation side of the piston ring at one side is at the highest position for relative position thereof). The high position of the oscillation side of the piston ring would make the piston ring contacting an inside surface of the cylinder, so as to be in a worse condition of stress concentration, leading to contact point of the piston ring with the inside surface of the cylinder at the high position of the oscillation side would easily cause detachment and breaking of the piston ring due to stress of stretching.

Thus, it is an objective of the present invention to prevent a piston ring from detachment and breaking due to over concentration of stress at a contact point of the piston ring with an inside surface of a cylinder at a high position of an oscillation side.

SUMMARY OF THE INVENTION

The present invention provides a wear-preventive air-charger piston structure. The piston structure comprises a piston rod, a piston ring, and a top cover. The piston rod has a top that is formed with a piston top seat. The piston ring is disposed on the piston top seat. The piston ring has a top that is covered with a top cover. A surface of the top cover is provided with an airtight plate mounted thereto. The top cover and the piston top seat are securely fixed together to complete assembly of the piston structure. The piston structure further comprises at least one buffering element. The buffering element is arranged between the piston top seat of the piston rod and the piston ring. The buffering element has an outside diameter that is smaller than an outside diameter of the piston ring, in order to prevent the buffering element from generating contact abrasion with an inside surface of a cylinder.

The efficacy of the present invention is that at least one buffering element is arranged between the piston top seat of the piston rod and the piston ring, and the buffering element has the characteristics of elastic restoration and resistance to compression and high temperature. When the piston ring is in an inclined oscillating condition and at a high position of an oscillation side, the buffering element may function to absorb (buffer) the stress applied to the piston ring at the high position of the oscillation side to effectively prevent detachment and breaking of the piston ring resulting from stress concentration at a contact point of the piston ring with the inside surface of the cylinder at the high position of the oscillation side.

DETAILED DESCRIPTION OF THE PREFERRED EMBODIMENT

Figure 1:
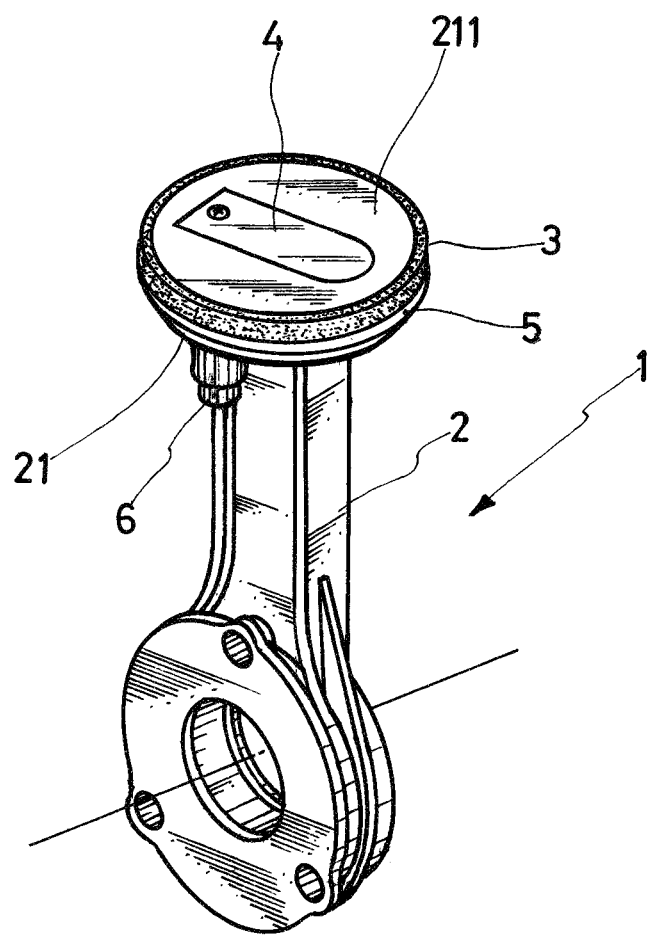
FIG. 1 is a perspective view showing a wear-preventive air-charger piston structure according to the present invention.
Figure 2:
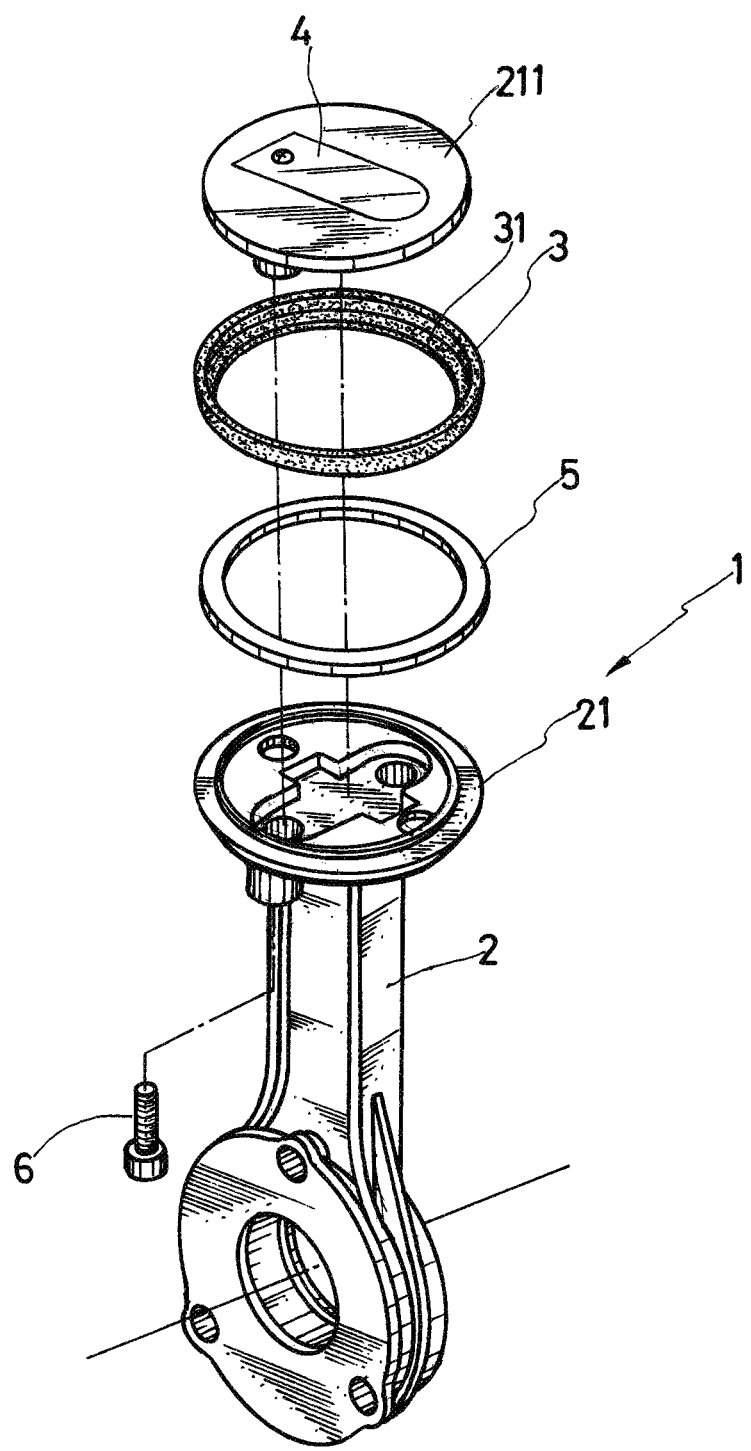
FIG. 2 is an exploded view showing the wear-preventive air-charger piston structure according to the present invention.
Figure 3:
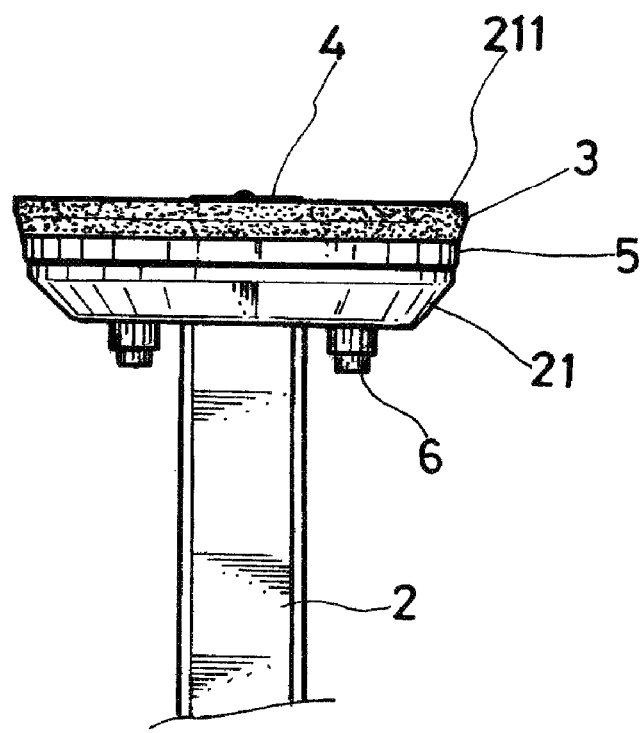
FIG. 3 is a side elevational view showing the wear-preventive air-charger piston structure according to the present invention.
Figure 4:
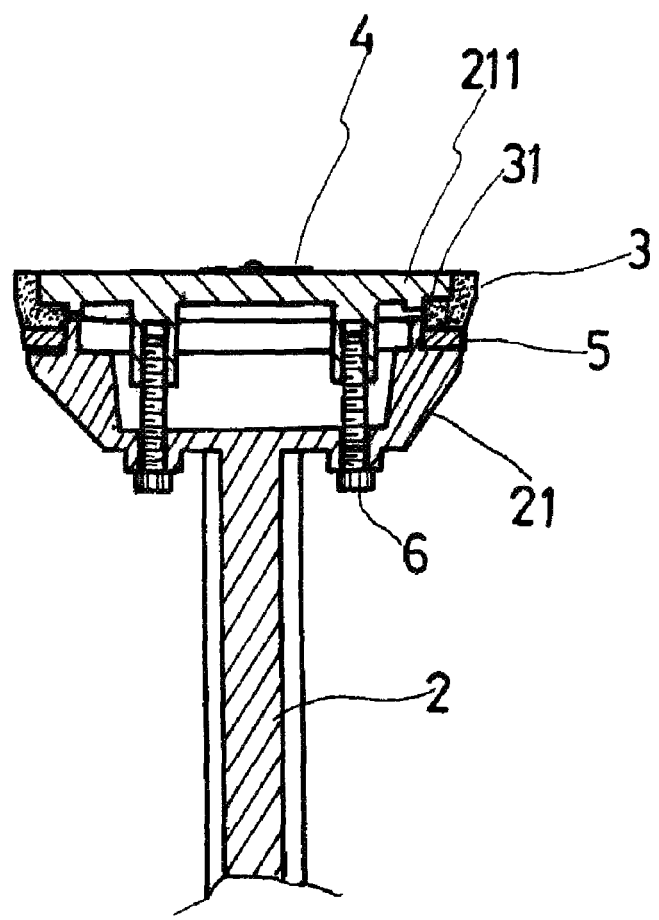
FIG. 4 is a cross-sectional view showing the wear-preventive air-charger piston structure according to the present invention.

For better understanding of the features and advantages of the present invention and to more clearly demonstrate the efficacy that can be achieved by the present invention, a detail description of the features and the advantages of the present invention will be provided below, with reference to the attached drawings. The aspect of the present invention will be expounded with reference to embodiment provided below, which, however, are not intended to impose constrains to the scope of the present invention in any respect.

Referring first to FIGS. 1, 2, 3, and 4, the present invention discloses a wear-preventive air-charger piston structure. The piston structure 1 comprises a piston rod 2, a piston ring 3, and a top cover 211.

The piston rod 2 has a top that is formed with a piston top seat 21, and the piston top seat 21 has a bottom that is provided with features including a plurality of air ingress holes and a plurality of locking holes. Such features are not novel parts of the present invention and no further details will be provided. Further, the piston rod 2 has a bottom that is provided with a feature for connection with a pre-arranged crankshaft, and such a feature is also not a novel part of the present invention and will not be further described herein.

The piston ring 3 is made in a configuration of hollow structure having a bottom surface 31 and is disposed on a surface of the piston top seat 21 of the piston rod 2. The top surface of the piston top seat 21 is covered by the top cover 211. An airtight plate 4 is mounted to a surface of the top cover. The top cover 211 and the piston top seat 21 are securely fixed to each other by means of a plurality of pre-arranged fastener elements 6, so that the piston ring 3, and thus, the bottom surface 31 thereof, is securely fixed between the piston top seat 21 and the top cover 211.

The piston structure 1 further comprises at least one buffering element 5. The buffering element 5 is characterized by having a function of elastic restoration or springing back (such as a plastic plate that is resistant to high temperature and compression). The buffering element 5 is in the form of a hollow ring configuration and has an outside diameter that is smaller than an outside diameter of the piston ring 3. The buffering element 5 is arranged between the piston top seat 21 of the piston rod 2 and the piston ring 3. Since the outside diameter of the buffering element 5 is smaller than the outside diameter of the piston ring 3, contact and abrasion of the buffering element 3 with an internal surface of a cylinder can be avoided.

In an illustrative example of the present invention, when the piston ring 3 is in an inclined oscillating condition and is at a high position of an oscillation side, where the piston ring 3 is caused to involve increased abrading contact with an inside surface of a cylinder at the high position of the oscillation side, the buffering element 5 functions to absorb (buffer) a stress acting on the piston ring 3 at the high position of the oscillation side, achieving an effect of preventing detachment and breaking of the piston ring 3 resulting from over concentration of stress caused by an increased abrading contact point of the piston ring 3 with the inside surface of the cylinder at the high position of the oscillation side.

Figure 5:
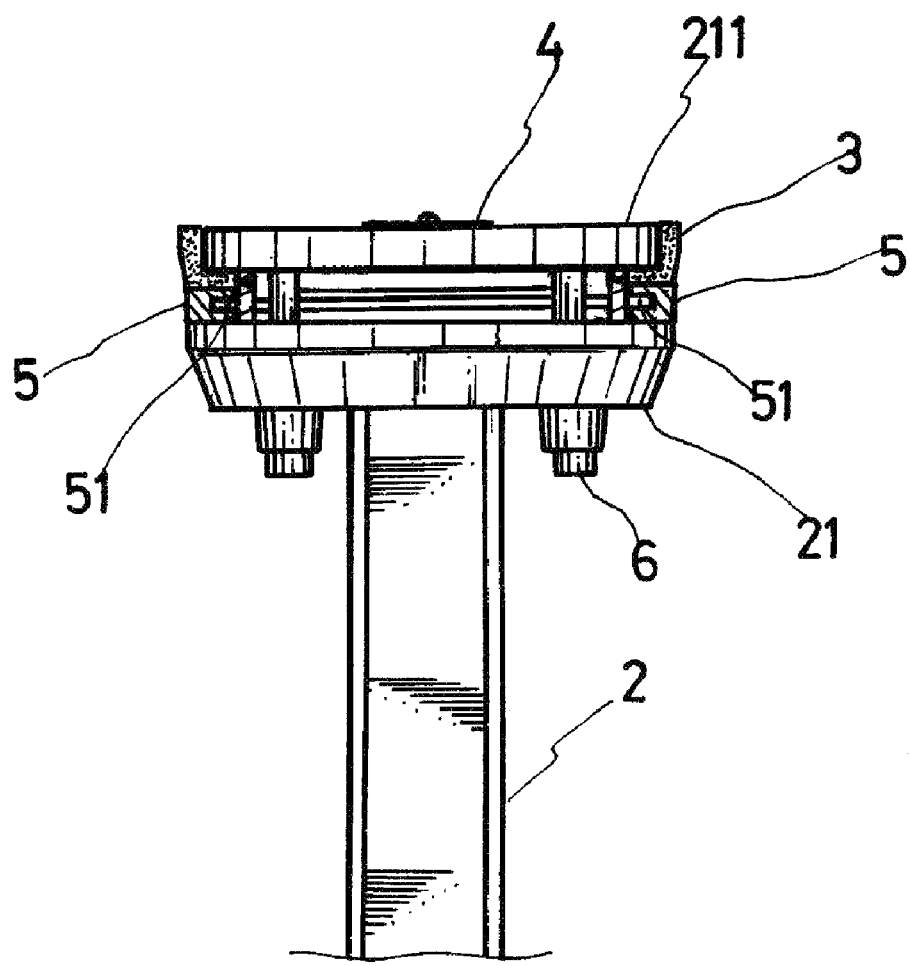
FIG. 5 is a schematic view showing a wear-preventive air-charger piston structure according to another embodiment of the present invention.

Reference is now made to FIG. 5, another embodiment of the present invention is provided as an additional example, wherein the buffering element 5 is made in a form of a hollow annular configuration and having a function of elastic restoration or springing back (such as a plastic plate that is resistant to high temperature and compression). The buffering element 5 is provided with a recess 51 formed in an inside surface thereof, and the recess 51 functions to provide a buffering space, so that the buffering element 5 is provided with a function of minute elastic deformation. The recess 51 provided in the buffering element 5 makes it possible for better absorption (buffering) of the stress applied to the piston ring 3 at the high position of the oscillation side.

I claim:

1. A wear-preventive air-charger piston structure, the piston structure comprising a piston rod, a piston ring, and a top cover, the piston rod having a top that is formed with a piston top seat, the piston ring being disposed on the piston top seat, the piston top seat being covered with the top cover, such that the top cover and the piston top seat are securely fixed together,
    wherein the piston structure further comprises a buffering element, the buffering element being arranged between the piston top seat and the piston ring, the buffering element having an outside diameter that is smaller than an outside diameter of the piston ring, wherein when the piston ring is in an inclined oscillating condition and is at a high position of an oscillation side, the buffering element absorbs a stress applied to the piston ring at the high position of the oscillation side;
    wherein the buffering element is a plastic plate in the form of a hollow ring and has an inside surface in which a recess is formed, the recess forming a buffering space.

2. The wear-preventive air-charger piston structure according to claim 1, wherein the buffering element has a function of elastic restoration and has characteristics of resistance to heat and compression.

3. The wear-preventive air-charger piston structure according to claim 1, wherein the top cover and the piston top seat are fixed together by a plurality of pre-arranged fastener elements.

4. The wear-preventive air-charger piston structure according to claim 1, wherein the piston ring is in the form of a hollow structure having a bottom surface.

* * * * *